United States Patent Office 3,822,358
Patented July 2, 1974

---

3,822,358
INSECTICIDAL COMPOSITIONS
Yositosi Okuno, Toyonaka, Yasushi Suzuki, Minoo, Toshio Mizutani, Hirakata, Hajime Hirai, Minoo, and Toru Kawanami, Kobe, Japan, assignors to Sumitimo Chemical Company, Limited, Osaka, Japan
Filed July 29, 1971, Ser. No. 167,251
Claims priority, application Japan, Aug. 3, 1970, 45/68,124; Aug. 19, 1970, 45/72,512
Int. Cl. A01n 9/02, 9/28
U.S. Cl. 424—285                                             1 Claim

ABSTRACT OF THE DISCLOSURE

An insecticidal composition in the form of a fumigant comprising an inert carrier and as an essential ingredient an effective amount of a chrysanthemate which contains more than 15% of the d-cis-isomer, and which has the formula,

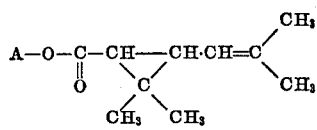

wherein A is

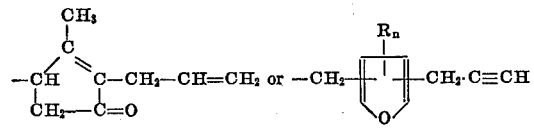

Figure 1:
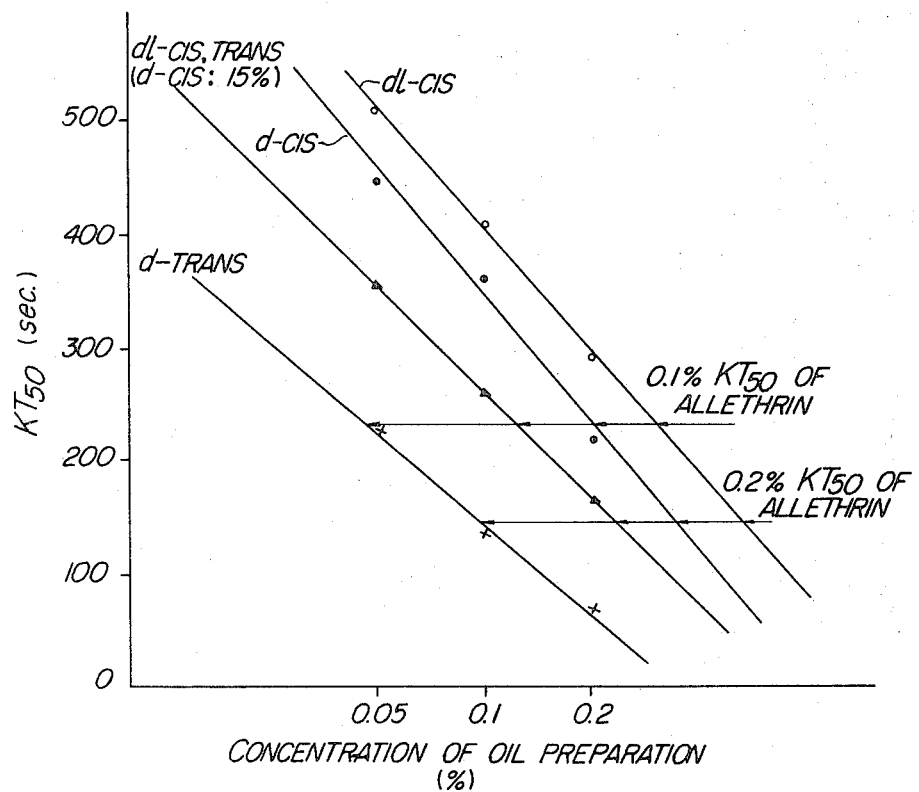

in which R is hydrogen or methyl group, and $n$ is 1 or 2, which has a rapid knock down effect on injurious insects such as mosquitoes and an effect to delay the recovery of knocked-down injurious insects, and is useful for sanitary, agricultural and horticultural purposes.

---

This invention relates to a novel insecticidal composition in the form of a fumigant which comprises an inert carrier and as an essential ingredient an effective amount of a d-cis-isomer of a chrysanthemate which contains more than 15% of the d-cis-isomer and which has the formula (I),

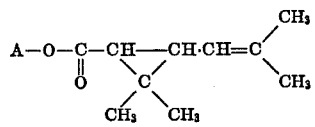

wherein A is

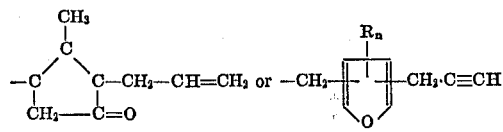

in which R is hydrogen or methyl group, and $n$ is 1 or 2.

An object of the present invention is to provide an inexpensive insecticidal composition in the form of a fumigant which is low in toxicity and rapid in knock down effect, and hence is useful for sanitary purposes and for agricultural and horticultural purposes.

Heretofore, oil sprays, aerosols and mosquito coils of pyrethrin and allethrin have widely been used as insecticides for environment sanitation because of their low toxicity to mammals and rapid knock down effect.

Recently, the control of santiary injurious insects such as mosquitoes, which are vectors of cerebritis, filaria and the like infectious diseases, has come to be a serious problem. What is of importance in the control of said injurious insects is to quickly knock down the insects and to kill them to inhibit their blood-sucking actions on mammals.

During the course of studies carried out with an aim to obtain insecticides having rapid knock down effect as well as strong killing effect with low toxicity to mammals, the present inventors found that d-cis-isomers of chrysanthemates represented by the formula (I) display far more excellent insecticidal activities than d-trans-isomers, particularly when used in the form of mosquito coils and the like which are necessarily subjected to heating. Surprisingly, the inventors attained a knowledge which is entirely different from the established theory concerning the relation between isomers and insecticidal effects in the case of conventional chrysanthemate type insecticides, i.e. the theory that in the case of allethrin and the like, d-trans-chrysanthemates display the most excellent insecticidal effects, and confirmed that the d-cis-isomers can be put into practical use with economical advantages. Based on the above knowledge, the inventors have accomplished the present invention.

It is well known that among the chrysanthemate type insecticides, allethrin, the isomers of which have most extensively been studied hitherto, has 8 isomers, and it is also well known that the said isomers are different from one another in insecticidal effect. For example, M. Elliott et. al. disclose in J. Sci. Food Agr. 20, No. 9, 561–65 (1969) that when the insecticidal effect of dl-trans-chrysanthemate of allethrolon is assumed as 100, the relative effect of dl-cis-chrysanthemate is 48, i.e. about ½ of the effect of said dl-trans-chrysanthemate, and when the insectcidal effect of d-trans-crysanthemate of allethrolon is assumed as 100, the relative effect of d-cis-chrysanthemate is 25, i.e. about ¼ of said d-trans-chrysanthemate. Thus, it has widely been known on the allethrin isomers, that the cis-isomer as an acid component is obviously inferior in insecticidal effect to the trans-isomer. Therefore, it has been considered that in order to increase the insecticidal effects of allethrin products, the use of d-trans-chrysanthemate is most desirable.

As mentioned previously, however, the present inventors have found, during the course of extensive studies on isomers of the chrysanthemates represented by the formula (I), that d-cis- and dl-cis-isomers of said chrysanthemates, when used in the form of fumigants such as mosquito coils, which are necessarily subjected to heating, display more excellent insecticidal effects than those of not only esters of dl-cis, trans-chrysanthemic acid (technical grade product obtained according to ordinary processes) but also corresponding esters of dl-trans- or d-trans-chrysanthemic acids, and have attained the novel knowledge which upsets the established theory concerning the relation between isomers and insecticidal effects in the case of the conventional chrysanthemate type insecticides.

According to the above-mentioned studies, the inventors have confirmed that in order to enhance the insecticidal effects of industrial products of the chrysanthemates represented by the aforesaid formula (I), it is the best measure to use esters rich in d-cis-chrysanthemic acid. That is, the inventors have confirmed that since the synthetic chrysanthemate represented by the formula (I) is a mixture comprising 70% of dl-trans-isomer and 30% of dl-cis-isomer, the ester may be enhanced in insecticidal effect by increasing the content of d-cis-isomer in said ester to more than 15% (more than 30% in the case of dl-cis-isomer), preferably more than 18%, and the higher the content of d-cis-isomer, the greater the insecticidal effect. In other words, the chrysanthemates used in the present invention contain necessarily more than 15% of d-cis-isomer and contain less than 85% of any isomer other than d-cis-isomer.

While it is well known at present that d-trans-chrysanthemates of allethrolon are superior in insecticidal activities to the conventional technical allethrin products, the greatest drawback encountered in the commercial scale production thereof lies in that according to the known process for producing chrysanthemic acid, trans- and cis-isomers are formed in a ratio of about 70:30, and by-produced cis-chrysanthemic acids have no uses and hence should necessarily be separated, isomerized or discarded, with the result that the d-trans-chrysanthemates become expensive.

In view of the above, it is epoch-making that the dl- and d-cis-chrysanthemic acids according to the present invention which have prominent effects as insecticides can be put into practical use, and practically usable insecticides can be obtained with marked economical advantages by using as starting materials cis-chrysanthemic acids which are by-produced in the production of the conventional trans-chrysanthemates having excellent insecticidal activities.

Examples of useful compounds according to the present invention include d-cis-chrysanthemates of the compounds (1) to (7) set forth below.

The esters according to the present invention can be obtained, for example, by reacting a d-cis chrysanthemic acid or a reactive derivative thereof with a corresponding furylmethyl alcohol or allethrolon, if necessary in the presence of a suitable adjuvant. The reactive derivative referred to in the above includes halides, anhydrides, lower alkyl esters and alkali metal salts. The alcohol may also be used, in some cases, in the form of a derivative such as p-toluenesulfonate or the like. Further, a dl-cis-isomer, i.e. a racemic isomer, which contains more than 15% of d-cis-isomer may also be used effectively.

Chrysanthemic acid synthesized according to the conventional procedure, which contains dl-cis,trans-isomers having a trans to cis ratio of about 70:30, easily gives a dl-cis-chrysanthemic acid when recrystallized from ethyl acetate, as reported by, for example, I.G.M. Campbell and S. H. Harper in Journal of Chemical Society, page 284 (1945). Alternatively, it is heated with stirring in benzene together with a boron trifluoride-ether complex to convert the dl-cis-chrysanthemic acid into dl-dihydrochrysanthemolactone, which is then separated from the dl-trans-chrysanthemic acid by extraction with an aqueous sodium hydroxide solution and thereafter ring-opened by acidifica-

| Compound number | Structure |
| --- | --- |
| (1) | 5-propargyl-furfuryl chrysanthemate. |
| (2) | 5-propargyl-3-furylmethyl chrysanthemate. |
| (3) | 2-methyl-5-propargyl-3-furylmethyl chrysanthemate. |
| (4) | 3-methyl-5-propargyl-furfuryl chrysanthemate. |
| (5) | 4-methyl-5-propargyl-3-furylmethyl chrysanthemate. |
| (6) | 4-methyl-5-propargyl-furfuryl chrysanthemate. |
| (7) | 2-allyl-3-methyl-cyclopent-2-ene-4-yl chrysanthemate. | tion with sulfuric acid to obtain the dl-cis-chrysanthemic acid.

When the thus obtained dl-cis-chrysanthemic acid may be esterified as it is to obtain a dl-cis-chrysanthemate, while when said acid is resolved by use of a suitable optical resolving agent, e.g. (+)-α-p-methylbenzyl-benzylamine, and then the resulting d-cis-chrysanthemic acid may be esterified to obtain a d-cis-chrysanthemate.

The insecticidal fumigant compositions of the present invention which contain the above-mentioned esters as active ingredients can be extensively used as insecticides not only for domestic use for the control of sanitary injurious insects such as houseflies, mosquitoes and the like injurious insects in the houses, but also for use in green houses, vinyl houses and warehouses, and for agricultural and horticultural purposes to control insects injurious to stored cereals and to agriculture and horticulture.

dl-cis-chrysanthemate, allethronyl dl-cis,trans-chrysanthemate (containing 15% of d-cis-isomer) and a commercial allethrin product (containing 7.5% of d-cis-isomer) was dissolved in deodorized kerosene, and 0.7 ml. of the resulting solution was sprayed by use of an atomizer into a (70 cm.)³ glass chamber, in which had been liberated a group of about 20 adults of northern house mosquitoes. After the spraying, the number of knocked-down mosquitoes was counted at definite intervals for 10 minutes. After repeating the above operation several times, the 50% knock down time ($KT_{50}$) of the mosquitoes was calculated. Further, the mosquitoes knocked down within a period of 10 minutes were collected and allowed to stand in an observation cage, in which a bait had been placed, and the number of killed insects was counted to calculate the ratio of killed insects. The results obtained were as set forth in Table 2 and FIG. 1.

TABLE 2

| | Oil spray | | Relative effectiveness according to comparison[1] in concentration | | | | |
|---|---|---|---|---|---|---|---|
| | | | Concentration corresponding to the effectiveness of 0.1% allethrin | | Concentration corresponding to the effectiveness of 0.2% allethrin | | |
| Test compound | Concentration (percent) | $KT_{50}$ (sec.) | Concentration (percent) | Effectiveness ratio | Concentration (percent) | Effectiveness ratio | Ratio of killed insects (percent) |
| Allethronyl d-cis-chrysanthemate | 0.05 | 442 | 0.2 | 0.5 | 0.34 | 0.6 | 50 |
| | 0.1 | 360 | 0.2 | 0.5 | 0.34 | 0.6 | 65 |
| | 0.2 | 220 | 0.2 | 0.5 | 0.34 | 0.6 | 86 |
| Allethronyl d-trans-chrysanthemate | 0.05 | 225 | 0.047 | 2.1 | 0.098 | 2.0 | 64 |
| | 0.1 | 134 | 0.047 | 2.1 | 0.098 | 2.0 | 89 |
| | 0.2 | 67 | 0.047 | 2.1 | 0.098 | 2.0 | 100 |
| Allethronyl dl-cis-chrysanthemate | 0.05 | 509 | 0.31 | 0.32 | 0.54 | 0.37 | 31 |
| | 0.1 | 408 | 0.31 | 0.32 | 0.54 | 0.37 | 52 |
| | 0.2 | 292 | 0.31 | 0.32 | 0.54 | 0.37 | 80 |
| Allethronyl dl-cis, trans-chrysanthemate (containing 15% of d-cis-isomer) | 0.05 | 350 | 0.122 | 0.8 | 0.232 | 0.9 | 51 |
| | 0.1 | 256 | 0.122 | 0.8 | 0.232 | 0.9 | 65 |
| | 0.2 | 164 | 0.122 | 0.8 | 0.232 | 0.9 | 87 |
| Commercial allethrin product (containing 7.5% of d-cis-isomer) | 0.05 | — | — | — | — | — | — |
| | 0.1 | 232 | 0.1 | 1.0 | 0.2 | 1.0 | 68 |
| | 0.2 | 145 | 0.1 | 1.0 | 0.2 | 1.0 | 87 |

[1] A value calculated by inserting the $KT_{50}$ value of each of 0.1% and 0.2% oil sprays of allethrin product into the concentration-$KT_{50}$ graph of Fig. 1.

The following examples are shown in order to clarify the fact that the present invention is entirely different in tendency from the established theory concerning the relation between isomers and insecticidal effects of the conventional allethrin.

In the first place, the fact that according to the experiments carried out by the present inventors also, the esters of the present invention, when applied as drops or when used in the form of oil sprays, display such effects as in the established theory, is shown below with reference to Experimental Examples 1 and 2.

Experimental Example 1

Each of allethronyl d-cis-chrysanthemate, allethronyl d-trans-chrysanthemate and a commercial allethrin product (containing 7.5% of d-cis-isomer) was diluted with acetone to a test concentration, and the insecticidal effect of the resulting composition was tested by dropping a trace amount of the composition onto the dorsum of prothorax of a housefly adult by use of a microsyringe. As the result, the 50% lethal doses ($LD_{50}$) of the individual compositions after 24 hours were as set forth in Table 1.

TABLE 1

| Test compound | $LD_{50}$ (γ/fly) | Relative effectiveness |
|---|---|---|
| Allethronyl d-cis-chrysanthemate | 0.85 | 0.97 |
| Allethronyl d-trans-chrysanthemate | 0.27 | 3.00 |
| Commercial allethrin product (containing 7.5% of d-cis-isomer) | 0.82 | 1.00 |

Experimental Example 2

A given amount of each of allethronyl d-cis-chrysanthemate, allethronyl d-trans-chrysanthemate, allethronyl The results shown in the above Experimental Examples 1 and 2 well coincide with the results of examination of the conventional allethrin isomers, and indicate that allethronyl d-trans-chrysanthemate is superior in insecticidal effect to allethronyl d-cis-chrysanthemate.

In the next place, the effects of the fumigant composition of the present invention are set forth below with reference to Experimental Examples 3 and 4.

Experimental Example 3

Mosquito coils containing individually each 0.15%, 0.3% and 0.6% of allethronyl d-cis-chrysanthemate, allethronyl d-trans-chrysanthemate, allethronyl dl-cis-chrysanthemate were prepared.

For comparison, there were prepared mosquito coils containing each 0.3%, 0.6% and 0.9% of an allethrin product, which is most frequently used at present, and allethronyl dl-cis,trans-chrysanthemate (containing 15% of d-cis-isomer).

Into a (70 cm.)³ glass chamber was liberated a group of about 20 northern house mosquitoes, and 1 g. of each of the above-mentioned mosquito coils was ignited on both ends and placed at the center of the bottom of the chamber. Thereafter, the number of knocked down mosquitoes was counted with lapse of time for 24 minutes. After repeating the above operation several times, the 50% knock down time ($KT_{50}$) of the mosquitoes was calculated. Further, the mosquitoes knocked down within a period of 24 minutes were collected and allowed to stand overnight at room temperature in an observation cage, in which a bait had been placed, and the number of killed insects was counted to calculate the ratio of killed insects. The results obtained were as shown in Table 3 and FIG. 2.

TABLE 3

| Test compound | Mosquito coil Concentration (percent) | $KT_{50}$ (min., sec.) | Relative effectiveness according to comparison[1] in concentration | | | | | | Ratio of killed insects (percent) |
|---|---|---|---|---|---|---|---|---|---|
| | | | Concentration corresponding to the effectiveness of 0.3% allethrin | | Concentration corresponding to the effectiveness of 0.6% allethrin | | Concentration corresponding to the effectiveness of 0.9% allethrin | | |
| | | | Concentration (percent) | Effectiveness ratio | Concentration (percent) | Effectiveness ratio | Concentration (percent) | Effectiveness ratio | |
| Allethronyl d-cis-chrysanthemate | 0.15 | 6'42'' | 0.053 | 5.7 | 0.091 | 6.6 | 0.127 | 7.1 | 76 |
| | 0.3 | 4'42'' | 0.053 | 5.7 | 0.091 | 6.6 | 0.127 | 7.1 | 93 |
| | 0.6 | 2'54'' | 0.053 | 5.7 | 0.091 | 6.6 | 0.127 | 7.1 | 98 |
| Allethronyl d-trans-chrysanthemate | 0.15 | 7'48'' | 0.075 | 4.0 | 0.14 | 4.3 | 0.205 | 4.4 | 72 |
| | 0.3 | 6'12'' | 0.075 | 4.0 | 0.14 | 4.3 | 0.205 | 4.4 | 90 |
| | 0.6 | 4'24'' | 0.075 | 4.0 | 0.14 | 4.3 | 0.205 | 4.4 | 96 |
| Allethronyl dl-cis-chrysanthemate | 0.15 | 9'42'' | 0.168 | 1.8 | 0.295 | 2.0 | 0.410 | 2.2 | 60 |
| | 0.3 | 8'00'' | 0.168 | 1.8 | 0.295 | 2.0 | 0.410 | 2.2 | 74 |
| | 0.6 | 5'54'' | 0.168 | 1.8 | 0.295 | 2.0 | 0.410 | 2.2 | 91 |
| Allethronyl d-cis, trans-chrysanthemate (containing 15% of d-cis-isomer) | 0.3 | 9'18'' | 0.267 | 1.1 | 0.510 | 1.2 | 0.760 | 1.2 | 75 |
| | 0.6 | 7'36'' | 0.267 | 1.1 | 0.510 | 1.2 | 0.760 | 1.2 | 91 |
| | 0.9 | 6'42'' | 0.267 | 1.1 | 0.510 | 1.2 | 0.760 | 1.2 | 100 |
| Allethrin product (containing 7.5% of dl-cis-isomer) | 0.3 | 9'30'' | 0.3 | 1.0 | 0.6 | 1.0 | 0.9 | 1.0 | 71 |
| | 0.6 | 8'00'' | 0.3 | 1.0 | 0.6 | 1.0 | 0.9 | 1.0 | 90 |
| | 0.9 | 7'06'' | 0.3 | 1.0 | 0.6 | 1.0 | 0.9 | 1.0 | 100 |

Figure 2:
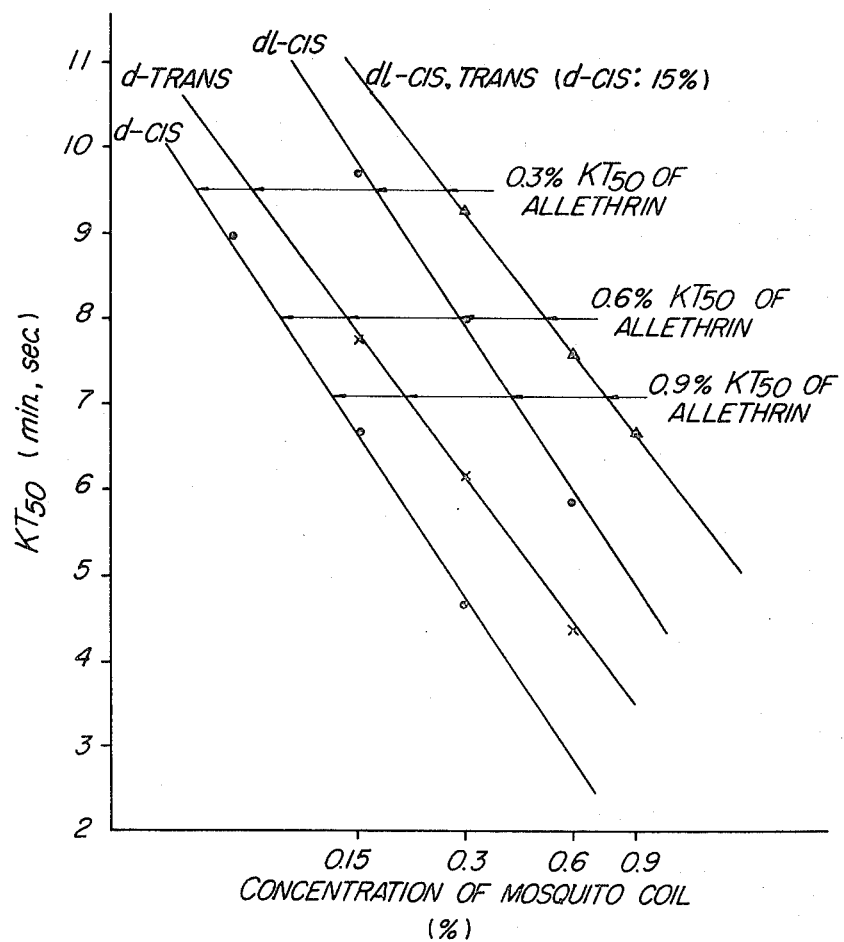

[1] A value calculated by inserting the $KT_{50}$ value of each of 0.3%, 0.6% and 0.9% mosquito coils of allethrin product into the concentration $KT_{50}$ graph of Fig. 2.

Experimental Example 4

Mosquito coils containing individually each 0.15%, 0.3% and 0.6% of a d-cis-, l-cis- or d-trans-isomer of the previously exemplified compound (1); a mixture comprising 70% of dl-trans-isomer and 30% of dl-cis-isomer; a mixture comprising 85% of dl-trans-isomer and 15% of dl-cis-isomer; and a dl-cis-, d-cis-, dl-trans- or d-trans-isomer of the exemplified compound (3) were prepared.

For comparison, there was prepared a mosquito coil containing 0.6% of commercial allethrin (containing 5% of d-cis-isomer), which is most frequently used at present.

Into a (70 cm.)³ glass chamber was liberated a group of about 20 northern house mosquito adults, and 1 g. of each of the above-mentioned mosquito coils was ignited on both ends and placed at the center of the bottom of the chamber. Thereafter, the number of knocked down mosquitoes was counted with lapse of time for 24 minutes. After repeating the above operation several times, the 50% knock down time ($KT_{50}$) of the mosquitoes was calculated. Further, the mosquitoes knocked down within a period of 24 minutes were collected and allowed to stand overnight at room temperature in an observation cage, in which a bait had been placed, and the number of killed insects was counted to calculate the ratio of killed insects. The results obtained were as set forth in Table 4 and FIGS. 3 and 4, in which the compounds of the present invention are represented by the numbers of the previously exemplified compounds.

TABLE 4

| Composition | | | | Relative effectiveness according to comparison in concentration—Concentration corresponding to the effectiveness of 0.6% allethrin[1] | |
|---|---|---|---|---|---|
| Compound | Concentration (percent) | $KT_{50}$ (min., sec.) | Ratio of killed insects (percent) | Concentration (percent) | Effectiveness ratio |
| dl-Cis-isomer of compound (1) | 0.15 | 11'00'' | 65 | 0.2 | 3.00 |
| | 0.3 | 8'12'' | 84 | 0.2 | 3.00 |
| | 0.6 | 6'30'' | 100 | 0.2 | 3.00 |
| Control: dl-Trans-isomer of compound (1) | 0.15 | 12'48'' | 31 | 0.305 | 1.97 |
| | 0.3 | 9'42'' | 67 | 0.305 | 1.97 |
| | 0.6 | 7'18'' | 90 | 0.305 | 1.97 |
| d-Cis-isomer of compound (1) | 0.15 | 7'12'' | 87 | 0.066 | 9.10 |
| | 0.3 | 5'36'' | 98 | 0.066 | 9.10 |
| | 0.6 | 5'06'' | 100 | 0.066 | 9.10 |
| Control: d-Trans-isomer of compound (1) | 0.15 | 10'12'' | 75 | 0.15 | 4.00 |
| | 0.3 | 7'00'' | 95 | 0.15 | 4.00 |
| | 0.6 | 5'30'' | 100 | 0.15 | 4.00 |
| dl-Cis-isomer of compound (3) | 0.15 | 11'12'' | 62 | 0.207 | 2.90 |
| | 0.3 | 8'24'' | 80 | 0.207 | 2.90 |
| | 0.6 | 6'36'' | 98 | 0.207 | 2.90 |
| Control: dl-Trans-isomer of compound (3) | 0.15 | 12'54'' | 28 | 0.33 | 1.82 |
| | 0.3 | 10'00'' | 65 | 0.33 | 1.82 |
| | 0.6 | 7'42'' | 87 | 0.33 | 1.82 |
| d-Cis-isomer of compound (3) | 0.15 | 8'06'' | 84 | 0.072 | 8.34 |
| | 0.3 | 6'18'' | 97 | 0.072 | 8.34 |
| | 0.6 | 4'42'' | 100 | 0.072 | 8.34 |
| Control: d-Trans-isomer of compound (3) | 0.15 | 11'00'' | 76 | 0.177 | 3.39 |
| | 0.3 | 7'06'' | 90 | 0.177 | 3.39 |
| | 0.6 | 5'18'' | 100 | 0.177 | 3.39 |
| Control: d-Cis-isomer 15%, l-Cis-isomer 15%, dl-Trans-isomer 70% of compound (1) | 0.15 | 11'36'' | 50 | 0.237 | 2.53 |
| | 0.3 | 8'54'' | 78 | 0.237 | 2.53 |
| | 0.6 | 6'48'' | 95 | 0.237 | 2.53 |
| Control: d-Cis-isomer 7.5%, l-Cis-isomer 7.5%, dl-Trans-isomer 85% of compound (1) | 0.15 | 12'00'' | 39 | 0.265 | 2.26 |
| | 0.3 | 9'24'' | 70 | 0.265 | 2.26 |
| | 0.6 | 7'00'' | 92 | 0.265 | 2.26 |
| Control allethrin | 0.6 | 9'54'' | 58 | 0.6 | 1.00 |

Figure 3:
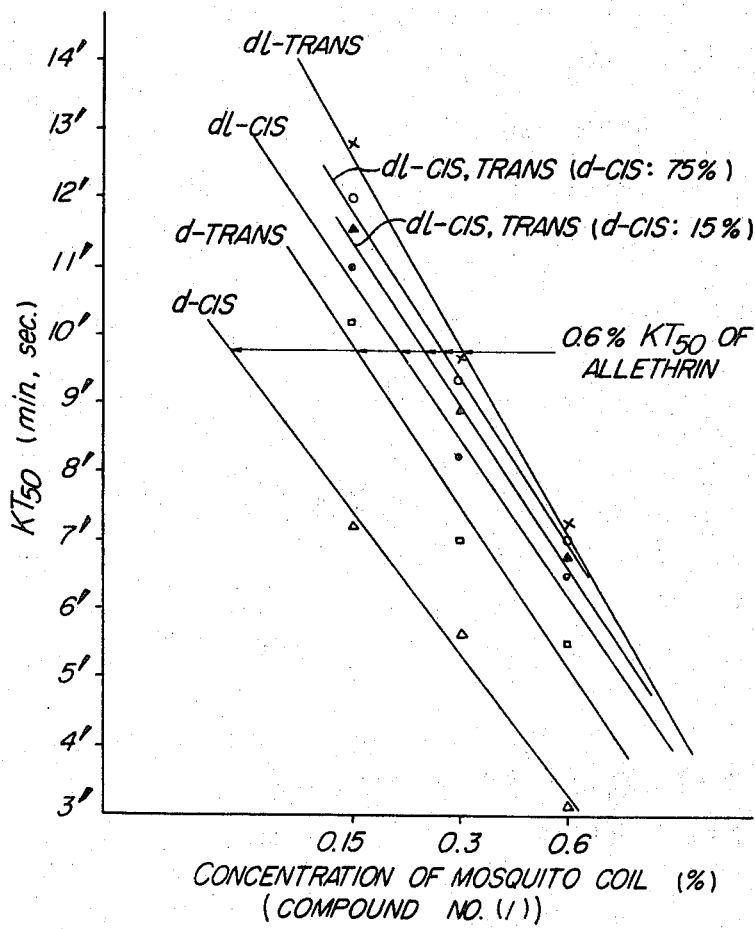
Figure 4:
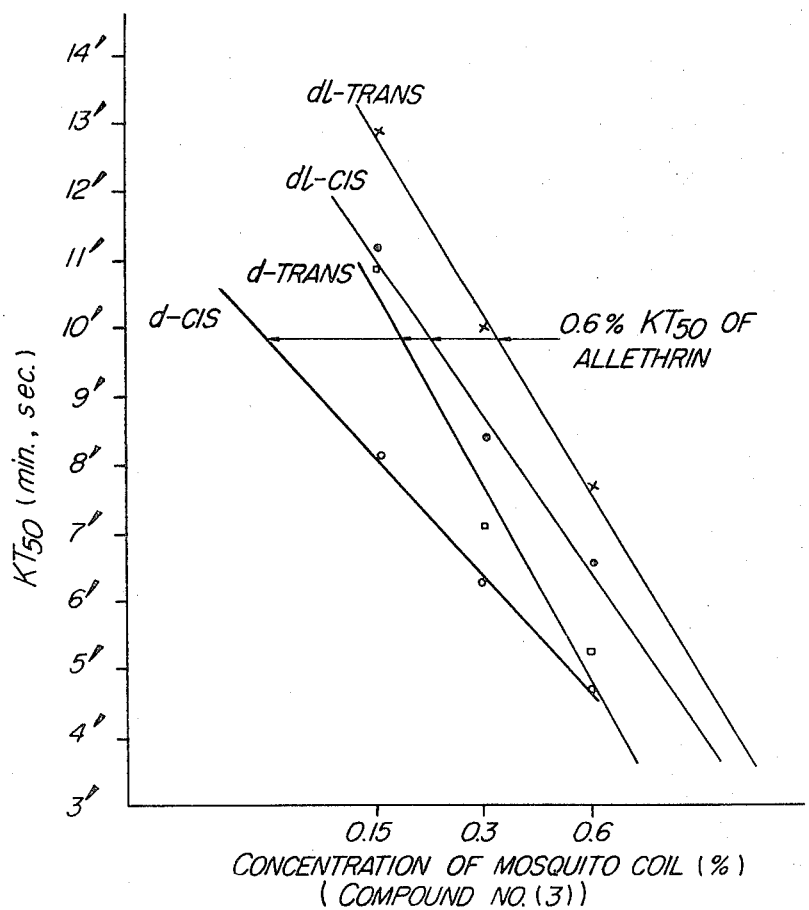

[1] A value calculated by inserting the $KT_{50}$ value of 0.6% allethrin into the concentration-$KT_{50}$ graph shown in each of Figs. 3 and 4.

The above-mentioned Experimental Examples show that when used in the form of oil spray, the d-trans-chrysanthemate is most excellent in knock down effect, whereas when used in the form of mosquito coil, the d-cis-chrysanthemate according to the present invention is particularly marked in knock down effect and is superior to the d-trans-chrysanthemate.

The fact that the d-cis-chrysanthemate displays a marked insecticidal effect when used in the form of a fumigant is a novel knowledge which can never be inferred from the results of conventional studies of allethrin isomers.

The esters which are used as active ingredients of the present insecticidal compositions may not only be used singly but may be incorporated with, as stabilizers, suitable amounts of phenol or bisphenol derivatives such as BHT or the like, or arylamines such as phenyl-α-naphthylamine, phenyl-β-naphthylamine or condensation product of phenetidine with acetone, whereby compositions which have been more stabilized in insecticidal effect can be obtained. Further, the compositions may be increased in insecticidal activity by incorporation with synergists for pyrethroid type insecticides such as α-[2-(2-butoxyethoxy)ethoxy] - 4,5 - methylenedioxy - 2 - propyltoluene (hereinafter referred to as "piperonyl butoxide"), N-(2-ethylhexyl)-bicyclo(2,2,1)hepta - 5 - ene-anhydrophthalic acid-2,3-dicarboximide (hereinafter referred to as "MGK-264"), octachlorodipropyl ether (hereinafter referred to as "S-421"), IBTA, safroxane, Leathane, sulfoxide, Sesamex, etc.

In addition, united effects can be expected by blending the present compositions with other active ingredients such as, for example, pyrethrin, 5-benzyl-3-furylmethyl chrysanthemate (hereinafter referred to as "Chrysron," registered trademark of Sumitomo Chemical Co., Ltd.), 5 - benzyl - 3 - furylmethyl-2',3',3'-trimethylcyclopropane-1'-carboxylate, 3-phenoxybenzyl chrysanthemate, dimethylmaleimidomethyl - 2,2,3,3 - tetramethylcyclopropane-1-carboxylate, 3-phenoxybenzyl-2',2',3',3'-tetramethylcyclopropane - 1' - carboxylate, 5 - propargylfurfuryl chrysanthemate, 5-propargylfurfuryl chrysanthemate, N-(chrysanthemoxymethyl)-3,4,5,6-tetrahydrophthalimide (hereinafter referred to as "phthalthrin") or the like known pyrethroid type, carbamate type, chlorine type or organophosphorus type insecticides.

Procedures for preparation of the present compositions and effects thereof are illustrated below with reference to examples and test examples, but it is needless to say that the scope of the present invention is not limited to these examples.

Example 1

A solution of 0.3 g. of each of dl- and d-cis-isomers of the present compounds (1), (2), (3) and (4) respectively in 5 ml. of methanol is sufficiently mixed with a mosquito coil carrier comprising 60 g. of pyrethrum marc, 30 g. of Tabu powder and 9.7 g. of wood powder. The resulting mixture is kneaded with about 100 ml. of water, and then shaped and dried to obtain 100 g. of mosquito coils containing each of the above-mentioned compounds as an active ingredient.

If necessary, the thus obtained product is colored by addition of 0.5% of a dye such as Malachite Green or the like, or may be incorporated with a phenol or p-hydroxybenzoic acid ester.

Example 2

A solution of 0.3 g. of allethronyl d-cis-chrysanthemate in 5 ml. of methanol is treated according to the same procedure as in Example 1 to obtain 100 g. of a mosquito coil.

Example 3

A solution in chloroform of 0.2 g. of each of dl- and d-cis-isomers of the present compounds (1) and (3) is uniformly adsorbed onto the surface of an asbestos piece of 2.5 cm. x 1.5 cm. in area and 0.3 cm. in thickness. Onto the thus treated asbestos piece was pasted another asbestos piece identical in size therewith, whereby each insecticidal fumigant to be heated on an electric heating plate is obtained.

In addition to asbestos, there may be used such a fibrous carrier as pulp sheet or the like which is equivalent in effectiveness thereto.

Example 4

A solution of 0.3 g. of allethronyl d-cis-chrysanthemate in chloroform is treated according to the same procedure as in Example 3 to obtain an insecticidal fumigant.

Example 5

A mixture comprising 0.2 g. of each of a dl-cis-isomer of the present compound (1) and a d-cis-isomer of the present compound (3), 0.2 g. of allethrin and 0.6 g. of BHT is dissolved in 5 ml. of methanol, and the resulting solution is treated in the same manner as in Example 1 to obtain mosquito coils containing each of the above-mentioned compounds as an active ingredient.

Example 6

A solution in 5 ml. of methanol of 0.45 g. of allethronyl dl-cis-chrysanthemate (containing 49% of d-cis-isomer) and 0.05 g. of Chrysron is treated in the same manner as in Example 1, except that the amount of the wood flour in the mosquito coil carrier is varied to 9.5 g., whereby 100 g. of a mosquito coil is obtained.

Example 7

A mixture comprising 0.2 g. of a dl-cis-isomer of the present compound (1) and 0.1 g. of dimethylmaleimidomethyl-2,2,3,3-tetramethylcyclopropane - 1 - carboxylate is dissolved in 5 ml. of methanol, and the resulting solution is treated in the same manner as in Example 1 to obtain a mosquito coil.

Example 8

A solution of 0.5 g. of allethronyl dl-cis, trans-chrysanthemate (containing 25% of d-cis-isomer) in 5 ml. of methanol is treated in the same manner as in Example 1, except that the amount of the wood powder in the mosquito carrier is varied to 9.5 g., whereby 100 g. of a mosquito coil was obtained.

Example 9

A mixture comprising 0.2 g. of a dl-cis-isomer of the present compound (3) and 0.1 g. of Chrysron is dissolved in 5 ml. of methanol, and the resulting solution is treated in the same manner as in Example 1 to obtain a mosquito coil.

Example 10

A solution in 5 ml. of methanol of 0.3 g. of allethronyl dl-cis, trans-chrysanthemate (containing 18% of d-cis-isomer) and 0.2 g. of 5-propargyl furfuryl chrysanthemate is treated in the same manner as in Example 8 to obtain 100 g. of a mosquito coil.

Example 11

A mixture comprising 0.15 g. of a d-cis-isomer of the present compound (1) and 0.3 g. of S-421 is dissolved in chloroform, and the resulting solution is treated in the same manner as in Example 3 to obtain an insecticidal fumigant composition to be heated on an electric heating plate.

Example 12

A solution in chloroform of 0.2 g. of allethronyl dl-cis-chrysanthemate (containing 49% of d-cis-isomer) and 0.1 g. of 5-propargylfurfuryl crysanthemate is treated in the same manner as in Example 3 to obtain a fibrous insecticidal fumigant composition to be heated on an electric heating plate.

Insecticidal effects of the thus obtained compositions of the present invention are shown below with reference to test examples.

Test Example 1

Into a (70 cm.)³ glass chamber were liberated about 50 adults of nothern house mosquitoes. On the other hand, 0.2 g. of each of the mosquito coils obtained according to Examples 1, 5, 7 and 9 was ignited at both ends and placed at the center of the bottom of the chamber, and the smoke inside the chamber was stirred by means of a battery driven small motor fan (blade diameter 13 cm.). As the result, every mosquito coil could knock down more than 90% of the mosquitoes within 15 minutes and could kill more than 90% of the insects on the next day.

Test Example 2

The effects on northern house mosquitoes of the mosquito coils obtained in Examples 2, 6, 8 and 10 were examined according to the same procedure as in Test Example 1, whereby every mosquito coil could knock down more than 90% of the mosquitoes within 20 minutes and could kill more than 80% of the insects on the next day.

Test Example 3

Into a (70 cm.)³ glass chamber were liberated about 50 adults of northern house mosquitoes. Each of the fibrous insecticidal fumigant compositions obtained according to Examples 3, 4, 11 and 12 was put on an electric heating means, which was then placed at the center of the bottom of the chamber. Subsequently, an electric current was applied to the heating means, and the interior of the chamber was stirred by means of a battery driven small motor fan (blade diameter 13 cm.). As the result, more than 90% of the mosquitoes could be knocked down within 20 minutes, and more than 80% of the knocked-down insects could be killed on the next day.

What is claimed is:

1. A method for killing insects, which comprises exposing insects to the vapor produced from a mosquito coil containing as an essential ingredient an effective amount of a chrysanthemate of the formula

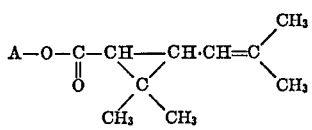

wherein A is

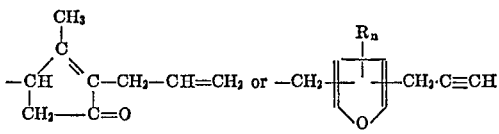

in which R is hydrogen or methyl group, and $n$ is 1 or 2, the crysanthemate containing about 18% to 100% by weight of d-cis-isomer.

References Cited

UNITED STATES PATENTS

| | | | |
|---|---|---|---|
| 3,186,903 | 6/1965 | Soltes | 424—306 |
| 3,542,928 | 11/1970 | Elliott | 424—306 |
| 3,636,059 | 1/1972 | Matsui et al. | 424—306 |

FOREIGN PATENTS

| | | | |
|---|---|---|---|
| 608,183 | 11/1960 | Canada | 424—306 |

ALBERT T. MYERS, Primary Examiner

F. E. WADDELL, Assistant Examiner

U.S. Cl. X.R.

424—306

UNITED STATES PATENT OFFICE
CERTIFICATE OF CORRECTION

Patent No. 3,822,358　　　　　　　　Dated July 2, 1974

Inventor(s) Yositosi OKUNO, et al

It is certified that error appears in the above-identified patent and that said Letters Patent are hereby corrected as shown below:

In Columns 7-8, Table 3, the fourth test compound should read -- dl-cis,trans- -- and not "d-cis,trans-".

Signed and sealed this 17th day of December 1974.

(SEAL)
Attest:

McCOY M. GIBSON JR.　　　　　　C. MARSHALL DANN
Attesting Officer　　　　　　　Commissioner of Patents